(12) United States Patent
Adachi et al.

(10) Patent No.: US 12,036,955 B2
(45) Date of Patent: Jul. 16, 2024

(54) HEATER CONTROL DEVICE

(71) Applicant: TOYOTA JIDOSHA KABUSHIKI KAISHA, Toyota (JP)

(72) Inventors: Takahiro Adachi, Chiryu (JP); Tatsuyoshi Nakajima, Nagoya (JP); Takahiro Miyadoh, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 510 days.

(21) Appl. No.: 17/370,168

(22) Filed: Jul. 8, 2021

(65) Prior Publication Data

US 2022/0032876 A1 Feb. 3, 2022

(30) Foreign Application Priority Data

Aug. 3, 2020 (JP) .................................. 2020-131859

(51) Int. Cl.
*B60S 1/02* (2006.01)
*B60S 1/08* (2006.01)
*H05B 1/02* (2006.01)
*H05B 3/84* (2006.01)

(52) U.S. Cl.
CPC ............. *B60S 1/026* (2013.01); *B60S 1/0848* (2013.01); *B60S 1/0874* (2013.01); *H05B 1/0236* (2013.01); *H05B 3/84* (2013.01)

(58) Field of Classification Search
CPC ...... B60S 1/026; B60S 1/0848; B60S 1/0874; H05B 1/0236; H05B 3/84
See application file for complete search history.

(56) References Cited

U.S. PATENT DOCUMENTS

| 2007/0115357 | A1* | 5/2007 | Stein | B60S 1/04 |
| | | | | 348/148 |
| 2013/0103257 | A1* | 4/2013 | Almeda | B60Q 1/303 |
| | | | | 701/36 |
| 2016/0182862 | A1* | 6/2016 | Cho | H04N 23/661 |
| | | | | 348/143 |
| 2017/0247019 | A1* | 8/2017 | Nagae | B60S 1/026 |
| 2017/0347405 | A1* | 11/2017 | Nagae | H05B 3/84 |
| 2017/0361809 | A1* | 12/2017 | Nagae | B60S 1/56 |

(Continued)

FOREIGN PATENT DOCUMENTS

JP 2017-114154 A 6/2017

*Primary Examiner* — Hussein Elchanti
(74) *Attorney, Agent, or Firm* — Sughrue Mion, PLLC

(57) ABSTRACT

Provided is a heater control device including a camera sensor configured to capture an image of an outside of a vehicle through an image capturing transparent region of a window glass, a camera heater configured to heat the image capturing transparent region, and a glass heater configured to heat a specific region being a stop position region of a wiper blade. The heater control device executes heating control of energizing the glass heater to heat the specific region during a period from an operation start time of an operation switch to an operation end time of the operation switch at the earliest. The heater control device executes deicing control of energizing the camera heater in order to deice the image capturing transparent region when a deicing execution condition, which is satisfied during a period from the operation start time to the operation end time at the earliest, is satisfied.

10 Claims, 11 Drawing Sheets

(56) References Cited

U.S. PATENT DOCUMENTS

| | | | | |
|---|---|---|---|---|
| 2017/0367150 A1* | 12/2017 | Nagae | ................. | H05B 1/02 |
| 2018/0056942 A1* | 3/2018 | Oikawa | ................. | H05B 3/84 |
| 2019/0061468 A1* | 2/2019 | Reed | ................. | B60H 1/00792 |
| 2019/0098705 A1* | 3/2019 | Salter | ................. | H05B 3/84 |
| 2019/0299886 A1* | 10/2019 | Rushton | ................. | B60R 11/04 |
| 2021/0251050 A1* | 8/2021 | Thangamani | ................. | H05B 3/84 |

* cited by examiner

HEATER CONTROL DEVICE

BACKGROUND

Technical Field

The present disclosure relates to a heater control device which includes a camera sensor configured to capture an image of an outside of a window glass from an inside of the window glass through an image capturing transparent region being a part of the window glass of a vehicle and a camera heater configured to heat the image capturing transparent region by being energized, and is configured to control the energization to the camera heater.

Related Art

Hitherto, there has been known a heater control device configured to control energization to a heater configured to heat a window glass of a vehicle. This heater generates heat by being energized.

A heater control device described in Japanese Patent Application Laid-open No. 2017-114154 (hereinafter referred to as "related-art device") controls energization to a full-surface heater for heating an entire surface of a window glass (front window). The related-art device executes deicing control of energizing the full-surface heater in order to melt ice attached to the window glass.

In more detail, the related-art device executes the deicing control during a period from "a time at which a full-surface heater switch is operated" to "a time at which a temperature (glass temperature) of the windows glass exceeds a predetermined value."

SUMMARY

Incidentally, a camera sensor for capturing an image of an outside of the vehicle is mounted inside the vehicle. Such a camera sensor captures the image of the outside of the vehicle from the inside of the vehicle through an image capturing transparent region being a partial region of the window glass. Driving assist control for assisting in driving by a driver of the vehicle is to be executed based on the image captured by the camera sensor. When snow or ice is attached to the image capturing transparent region, the camera sensor cannot capture the image of the outside of the vehicle, and cannot thus execute the above-mentioned driving assist control. To deal with this problem, it is required to heat the image capturing transparent region in order to deice the image capturing transparent region, but when the entire surface of the front window is heated as in the related-art device, consumed electric power is high. It is thus desired to provide a camera heater configured to heat not the entire front window, but the image capturing transparent region.

As described above, in the related-art device, the deicing control is executed based on the operation on the full-surface heater switch. When snow or ice is attached to the entire surface of the front window, the driver cannot visually recognize a forward view of the vehicle, which directly affects the driving of the driver. As a result, when snow or ice is attached to the entire surface of the front window, there is a high possibility that the driver operates the full-surface heater switch. However, even in a case in which an operation switch dedicated for the camera heater is provided, when snow or ice is attached to the image capturing transparent region, only the driving assist control cannot be executed, the driving of the driver is thus not directly affected.

Accordingly, there is a possibility that the driver forgets to operate the switch dedicated for the camera heater. Further, it is also difficult for the heater control device to determine that snow or ice is attached to the image capturing transparent region based on the image captured by the camera sensor.

The present disclosure has been made in view of the above-mentioned problems. That is, one object of the present disclosure is to provide a heater control device configured to increase a possibility of execution of deicing control when there is a high possibility that snow or ice is attached to an image capturing transparent region.

A heater control device (hereinafter referred to as "device of the present embodiment") according to at least one embodiment of the present disclosure includes: a camera sensor (22) configured to capture an image of an outside of a vehicle (VA) from an inside of the vehicle through an image capturing transparent region (101a) being a partial region of a window glass (101) of the vehicle, to thereby generate image data; a camera heater (24) configured to generate heat by being energized, and to heat the image capturing transparent region with the generated heat; a glass heater (35) configured to generate heat by being energized, and to heat a specific region with the generated heat, the specific region being a partial region of one of the window glass and another window glass different from the window glass and corresponding to a position of a wiper blade (103L, 103R) at a time when the wiper blade has finished a wiping operation for wiping one of the window glass and the another window glass; and a control unit (20) configured to execute driving assist control, which is control for the vehicle to assist in driving by a driver of the vehicle based on the image data, and to control the energization to the camera heater and the energization to the glass heater. The control unit is configured to: execute heating control of energizing the glass heater in order to deice the specific region during an operation period (Top) from a start time (t2) at which an operation switch is changed from an OFF state to an ON state through an operation of the driver of the vehicle to an end time (t3) at which the operation switch is changed from the ON state to the OFF state; and execute deicing control of energizing the camera heater in order to deice the image capturing transparent region (Step 735, Step 740, Step 800 to Step 895, Step 1005, and Step 1110) during a period in which a deicing execution condition, which is started to be satisfied at the start time and ends to be satisfied at the end time or a time (t5) after the end time, is satisfied ("No" in Step 705, and "No" in Step 710).

When the specific region is frozen, the wiper blade becomes inoperable, and hence the freezing of the specific region directly affects the driving of the driver. As a result, when the driver notices the freezing of the specific region, there is an extremely high possibility that the driver changes the operation switch from the OFF state to the ON state. When the specific region is frozen, there is a high possibility that the image capturing transparent region is also similarly frozen, or snow or ice is attached to the image capturing transparent region, and the camera sensor cannot thus capture an image of the outside of the vehicle. According to the device of the present embodiment, the deicing control is started at the start time at which the operation switch is changed from the OFF state to the ON state, and it is thus possible to increase a possibility that the deicing control can be executed when there is a high possibility that the image capturing transparent region is frozen.

In the device of the present embodiment, the glass heater may be a glass heater configured to heat a specific region being an entire surface of another glass window different from the window glass.

When snow or ice is attached to the specific region being the entire surface of the another window glass, this state directly affects the driving of the driver, and hence there is an extremely high possibility that the driver changes the operation switch from the OFF state to the ON state when snow or ice is attached to the specific region. Further, when snow or ice is attached to the specific region, there is a high possibility that snow or ice is attached also to the image capturing transparent region. Thus, according to the device of the present embodiment, when there is a high possibility that the image capturing transparent region is frozen, it is possible to increase the possibility that the deicing control can be executed.

In one aspect of the control device of the present embodiment, the control unit is configured to determine that the satisfaction of the deicing execution condition is finished at a deicing completion time (Step 635, "Yes" in Step 750, "Yes" in Step 905, Step 1005, and Step 1110) and to finish the deicing control, the deicing completion time being a time at which a first unit area electric power amount, which is obtained by dividing a total electric power amount consumed by the camera heater in the deicing control after the deicing control starts by an area of the image capturing transparent region, becomes equal to or larger than a second unit area electric power amount, which is obtained by dividing a total electric power amount consumed by the glass heater during the operation period by an area of the specific region.

An electric power amount required to melt ice attached to an area having a predetermined size is the same irrespective of whether the area is in the image capturing transparent region or the specific region. When the operation switch is changed from the ON state to the OFF state, it is considered that the driver determines that the deicing in the specific region is completed. Thus, the second unit area electric power amount is an electric power amount per unit area required for the deicing. According to this aspect, the deicing control is executed until the first unit area electric power amount matches the deicing electric power amount being the second unit area electric power amount, and hence there is a high possibility that the deicing in the image capturing transparent region is completed when the deicing control is finished. Consequently, without providing the operation switch dedicated for the camera heater as described above, the deicing control can be finished when the deicing in the image capturing transparent region is considered to be completed. Thus, according to this aspect, it is possible to prevent ice from remaining in the image capturing transparent region even when the deicing control is finished, and it is also possible to prevent electric power from being wastefully consumed through the execution of the deicing control even when the deicing in the image capturing transparent region is completed.

In the above-mentioned aspect, the control unit is configured to: continue to execute the deicing control at and after the end time when the deicing completion time is after the end time in accordance with a relationship between consumed electric power of the camera heater and the area of the image capturing transparent region in the deicing control, and consumed electric power of the glass heater and the area of the specific region in the heating control ("No" in Step 750, Step 735, and Step 740); and determine that the satisfaction of the deicing execution condition is finished at the deicing completion time, and to finish the deicing control ("Yes" in Step 750, Step 755, and Step 715 to Step 725).

According to the above-mentioned aspect, the deicing control is continued until the deicing is completed even after the operation period ends, and it is thus possible to prevent ice from remaining in the image capturing transparent region even when the deicing control is finished.

In the above-mentioned aspect, the control unit is configured to: assign, in the deicing control, a predetermined unit period to a non-energization period (Toff) in which the energization to the camera heater is not executed and to an energization period (Ton) in which a predetermined voltage is applied to the camera heater, to thereby execute the energization to the camera heater (Step 1005, and Step 725 of FIG. 10); start a new unit period when the predetermined unit period has elapsed since the start of the deicing control; and determine the non-energization period and the energization period so that the deicing completion time matches the end time when the deicing completion time is before the end time in accordance with a relationship between consumed electric power of the camera heater and the area of the image capturing transparent region in the deicing control in a case in which it is assumed that the entire predetermined unit period is assigned to the energization period, and consumed electric power of the glass heater and the area of the specific region in the heating control (Step 1005).

According to the above-mentioned aspect, the deicing completion time does not come before the operation end time, and it is thus possible to prevent electric power from being wastefully consumed through the execution of the deicing control due to the operation of the operation switch not being finished even when the deicing in the image capturing transparent region is completed.

In the above-mentioned aspect, the control unit is configured to apply, to the camera heater, such a voltage that the deicing completion time matches the end time in the deicing control (Step 1110).

According to the above-mentioned aspect, the deicing completion time matches the operation end time, and it is thus possible to prevent ice from remaining in the image capturing transparent region when the deicing control is finished at the operation end time. Further, the deicing completion time does not come before the operation end time, and it is thus possible to prevent electric power from being wastefully consumed through the execution of the deicing control due to the operation of the operation switch not being finished even when the deicing in the image capturing transparent region is completed.

In one aspect of the control device of the present embodiment, the control unit is configured to: execute, when the deicing execution condition is not satisfied, defogging control of energizing the camera heater with a defogging electric power amount per predetermined unit period in order to perform one of removal or prevention of fogging of the image capturing transparent region (Step 715 to Step 725, and Step 800 to Step 895), and energize, in the deicing control, the camera heater with a deicing electric power amount per predetermined unit period, the deicing electric power amount being larger than the defogging electric power amount and being used to deice the image capturing transparent region.

As a result, when the deicing execution condition is not satisfied, the defogging control is executed. Thus, the fogging of the image capturing transparent region can be removed or prevented.

In the above description, for easier understanding of the present disclosure, the terms and/or reference symbols used in at least one embodiment described below are enclosed in parentheses and assigned to the components of the present disclosure corresponding to the at least one embodiment. However, the constituent elements of the present disclosure are not limited to the at least one embodiment defined by the terms and/or reference symbols. Other objects, other features, and accompanying advantages of the present disclosure are easily understandable from the description of the at least one embodiment of the present disclosure to be given with reference to the following drawings.

DESCRIPTION OF THE EMBODIMENTS

Description is now given of a heater control device (hereinafter referred to as "this control device") 10 according to at least one embodiment of the present disclosure with reference to the drawings. This control device 10 is applied to a vehicle VA of FIG. 1. This control device 10 includes an ECU 20.

"ECU" is an abbreviation for an electric control unit. The ECU is an electronic control circuit including a microcomputer as a main component. The microcomputer includes, for example, a CPU, a ROM, a RAMI and an interface. The CPU executes instructions (routines) stored in the memory (ROM) to implement various functions. Some of the functions implemented by the ECU 20 may be implemented by another ECU.

Figure 2:
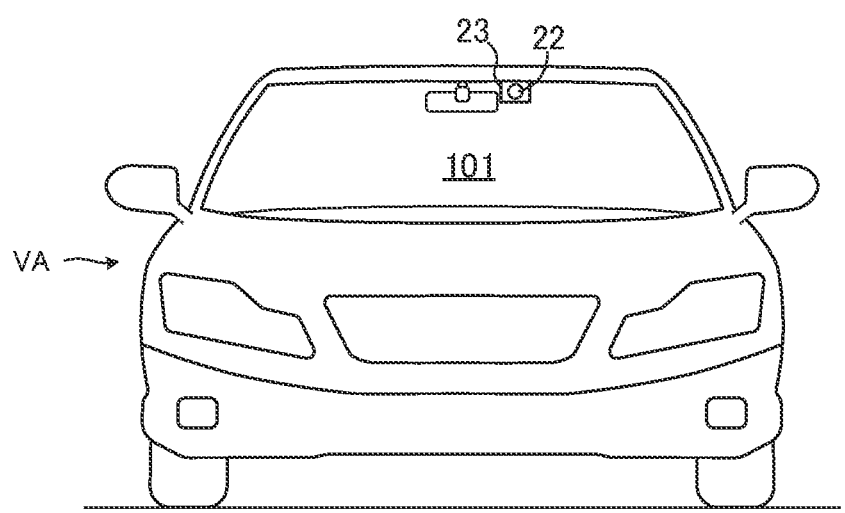
FIG. 2 is a front view of a vehicle.
Figure 3:
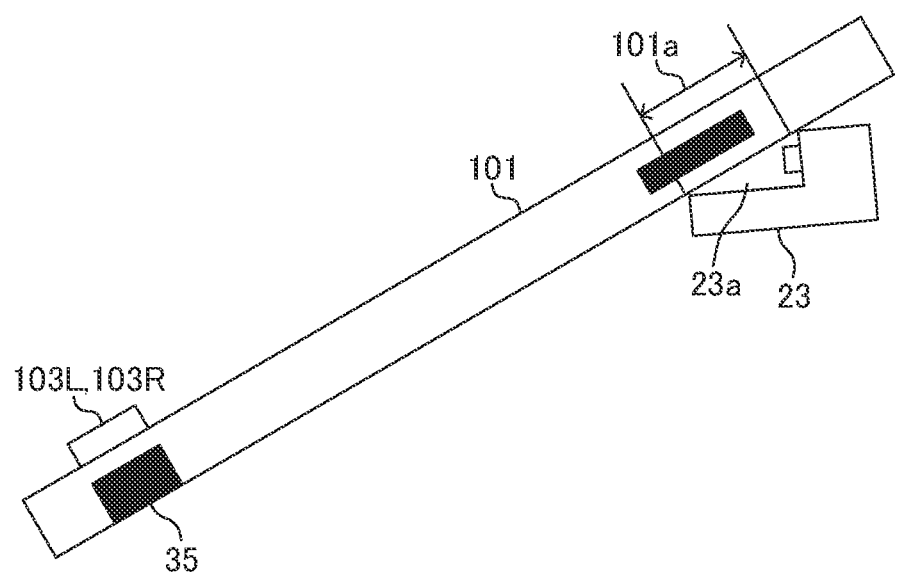
FIG. 3 is a side view of a front window of the vehicle.

The vehicle VA includes a camera sensor 22 and a camera heater 24. The camera sensor 22 is a widely-known CCD camera or CMOS camera. As illustrated in FIG. 2 and FIG. 3, the camera sensor 22 is arranged inside the vehicle VA, that is, inside a front window 101 being one of front window glasses of the vehicle VA. The camera sensor 22 is supported by the vehicle VA through a bracket (support member) 23. The bracket 23 is made of a resin material. The camera sensor 22 captures an image of the outside of the vehicle VA from the inside of the vehicle VA through an image capturing transparent region 101a (see FIG. 3) being a part of the front window 101.

Figure 1:
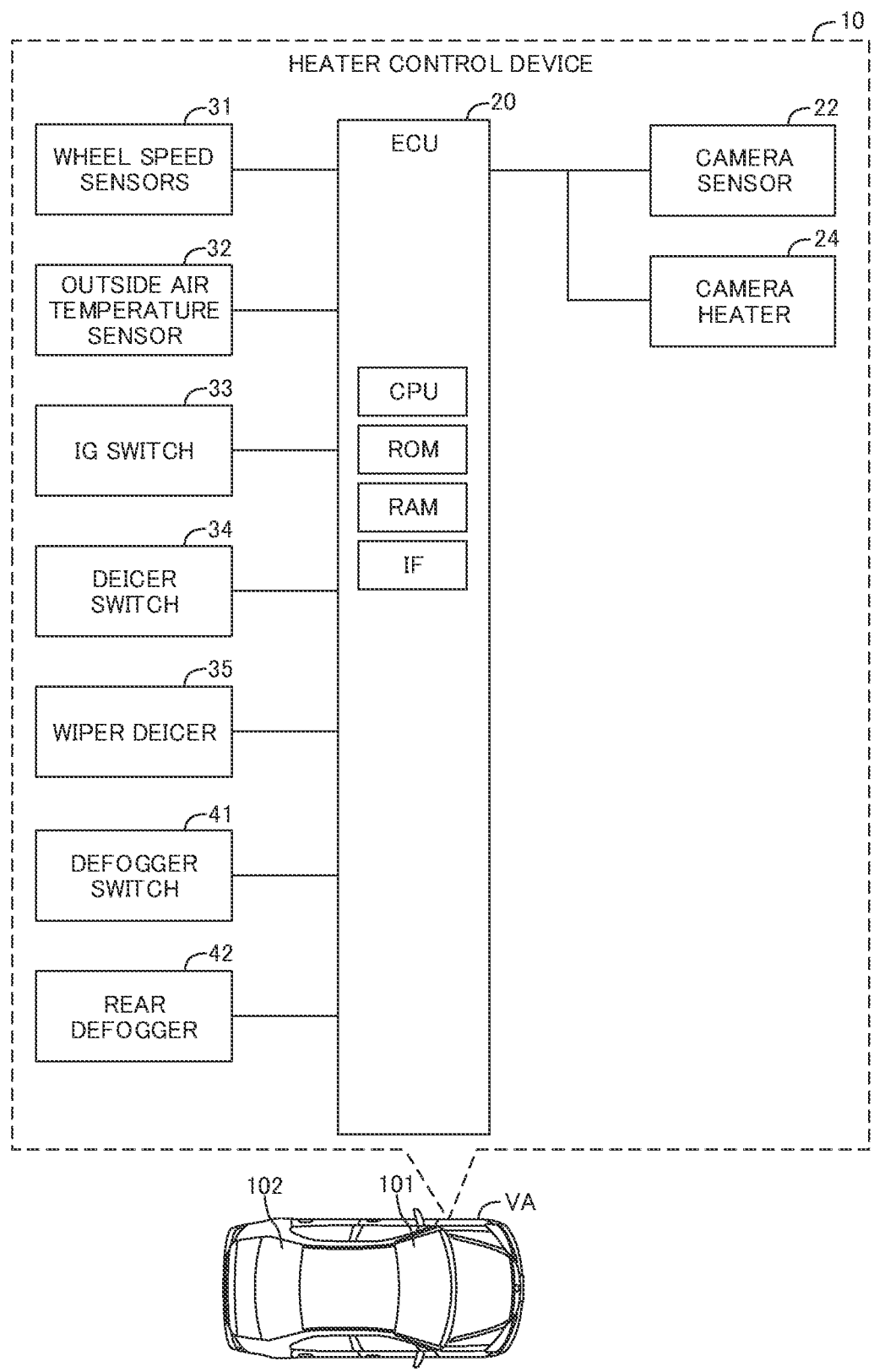
FIG. 1 is a schematic configuration diagram of a heater control device according to at least one embodiment of the present disclosure.

As illustrated in FIG. 1, the camera sensor 22 is connected to the ECU 20. The ECU 20 executes driving assist control based on image data on the image captured by the camera sensor 22. The driving assist control is control for assisting in driving of a driver of the vehicle VA. As an example of the driving assist control, there exists collision prevention control and adaptive cruise control (ACC). In the collision prevention control, the ECU 20 detects an obstacle that possibly collides with the vehicle VA based on the image data, and warns the driver of the vehicle VA before the collision with the obstacle, to thereby cause the driver to execute deceleration of the vehicle VA or the like. The ACC is control executed by the ECU 20 to follow a preceding vehicle without requiring operations of an accelerator pedal (not shown) and a brake pedal (not shown) by the driver while maintaining a vehicle speed VA and an inter-vehicle distance, which is a distance to "a preceding vehicle, which is positioned forward of the vehicle VA, and is detected based on the image data," to be constant.

The camera heater 24 is an electric heating wire embedded in the image capturing transparent region 101a of the front window 101 (see FIG. 3), As illustrated in FIG. 3, the image capturing transparent region 101a is surrounded by the bracket 23, which supports the camera sensor 22, and has a cross section of an L shape.

As illustrated in FIG. 1, the camera heater 24 is connected to the ECU 20, and is configured to be set by the ECU 20 to any one of an ON (energization) state and an OFF (non-energization or shutoff) state.

When the camera heater 24 is energized, the image capturing transparent region 101a (see FIG. 3) is heated with heat generated by the camera heater 24. As a result, when the image capturing transparent region 101a is fogged by moisture, the fogging is to be removed. When the image capturing transparent region 101a is not fogged, the image capturing transparent region 101a is to be prevented from being fogged. When the image capturing transparent region 101a is frozen, the image capturing transparent region 101a is to be deiced. The control, by the ECU 20, of energizing the camera heater 24 in order to remove or prevent fogging of the image capturing transparent region 101a is referred to as "defogging control." The control, by the ECU 20, of energizing the camera heater 24 in order to deice the image capturing transparent region 101a is referred to as "deicing control." The defogging control and the deicing control are different from each other in an electric power amount (hereinafter referred to as "energization amount") per unit period. An energization amount for the defogging control (hereinafter sometimes referred to as "first electric power amount") is smaller than an energization amount for the deicing control (hereinafter sometimes referred to as "second electric power amount").

The camera heater 24 may heat a space 23a (see FIG. 3) surrounded by the bracket 23, to thereby be capable of heating the image capturing transparent region 101a. In this case, the camera heater 24 may be arranged in the camera sensor 22 supported by the bracket 23.

The vehicle VA includes wheel speed sensors 31, an outside air temperature sensor 32, an ignition switch (ready switch) (hereinafter referred to as "IG switch") 33, a deicer switch 34, and a wiper deicer 35. Those components are connected to the ECU 20, A detailed description is given of a defogger switch 41 and a rear defogger 42 of FIG. 1 in modification examples described below. The wiper deicer 35 and the rear defogger 42 are sometimes referred to as "glass heater."

Each of the plurality of wheel speed sensors 31 is provided for each wheel of the vehicle VA, Each wheel speed sensor 31 generates a wheel pulse signal each time a corresponding wheel rotates by a predetermined angle. The ECU 20 counts the number of pulses in a unit period of the wheel pulse signal transmitted from each wheel speed sensor 31, and acquires a rotation speed (wheel speed) of each wheel based on the number of pluses. The ECU 20 acquires a vehicle speed Vs indicating the speed of the vehicle VA based on the wheel speed of each wheel. As an example the ECU 20 acquires an average value of the wheel speeds of the four wheels as the vehicle speed Vs.

The outside air temperature sensor 32 detects the air temperature outside the vehicle VA, and outputs a signal indicating the temperature (hereinafter referred to as "outside air temperature") Te. The ECU 20 acquires the outside air temperature Te based on the signal output by the outside air temperature sensor 32.

When the IG switch 33 is set to an ON position by the driver, a drive source (for example, internal combustion engine or electric motor) (not shown) is started, and the state of the drive source is consequently changed to an operation state. When the IG switch 33 is set to an OFF position by the driver, the state of the drive source is changed from the operation state to a non-operation state. The drive source in the operation state can apply a driving force to the vehicle VA in accordance with an operation amount of an acceleration operating element (not shown), The drive source in the non-operation state cannot apply the driving force to the vehicle VA even when the acceleration operating element is operated. The state in which the IG switch 33 is set to the ON position (that is, the state in which the drive source is in the operation state) is sometimes referred to as "ignition ON." The state in which the IG switch 33 is set to the OFF position (that is, the state in which the drive source is in the non-operation state) is sometimes referred to as "ignition OFF." Further, when the IG switch 33 is set to the ON position, the ECU 20 starts the execution of the defogging control.

The deicer switch 34 is changed from an OFF state to an ON state through a pressing operation by the driver of the vehicle VA. The deicer switch 34 that has been once changed to the ON state is maintained in the ON state until the driver of the vehicle again executes the pressing operation. When the driver again executes the pressing operation, the deicer switch 34 is changed from the ON state to the OFF state. In the period in which the deicer switch 34 is in the ON state, the ECU 20 energizes the wiper deicer 35, to thereby heat a stop position region SA (sometimes referred to as "specific region") described below. The energization control for the wiper deicer 35 is sometimes referred to as "heating control."

Figure 4:
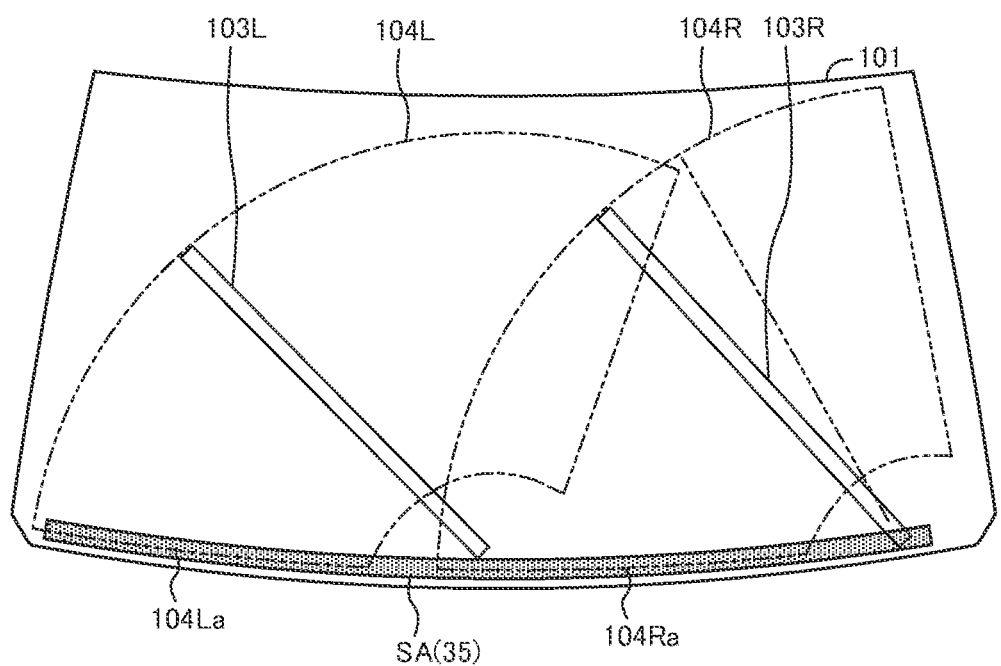
FIG. 4 is a front view of the front window of the vehicle.

As illustrated in FIG. 4, the wiper deicer 35 heats a stop position region SA formed of a lower side 104La of a wiping region 104L of a left wiper blade 103L and a lower side 104Ra of a wiping region 104R of a right wiper blade 103R. The stop position region SA is a peripheral region of the stop positions at which the wiper blades 103L and 103R are positioned when a wiping operation ends. The wiper deicer 35 is an electric heating wire embedded in the stop position region SA of the front window 101. When the wiper deicer 35 is energized, the stop position region SA is heated with heat generated by the wiper deicer 35. The driver executes the pressing operation on the deicer switch 34 in order to deice the stop position region SA. After that, when the driver determines that the deicing in the stop position region SA is completed, the driver again executes the pressing operation on the deicer switch 34.

<Overview of Operation>

This control device 10 determines that a deicing execution condition is satisfied in an operation period Top, which extends from an operation start time at which the deicer switch 34 is changed from the OFF state to the ON state through the operation by the driver to, at the earliest, an operation end time at which the deicer switch 34 is changed from the ON state to the OFF state, and thus executes the deicing control.

When the stop position region SA is frozen, the wiper blades 103L and 103R cannot execute the wiping operation, and the freezing thus directly affects the driving of the driver. To deal with this situation, when the driver notices the freezing of the stop position region SA, there is a high possibility that the driver changes the deicer switch 34 from the OFF state to the ON state. Further, when the stop position region SA is frozen, there is a high possibility that the image capturing transparent region 101a is also frozen, or snow or ice is attached to the image capturing transparent region 101a, and the image capturing transparent region 101a is in a state requiring the deicing. As a result, it is possible to execute the deicing control without providing a switch dedicated for the camera heater 24 when there is a high possibility that the deicing in the image capturing transparent region 101a is required.

<Operation Example>

Figure 5:
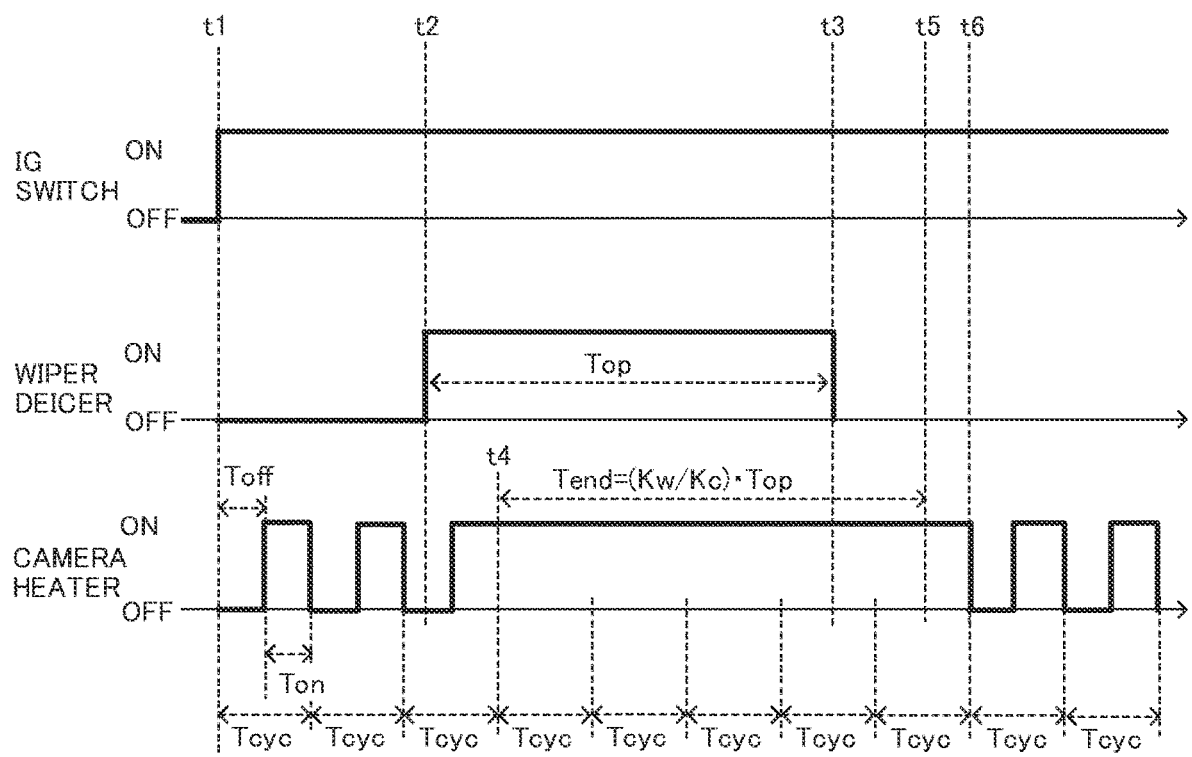
FIG. 5 is a timing chart for illustrating an operation of the heater control device.

With reference to FIG. 5, description is given of an operation example of this control device 10.

As described above, the ECU 20 starts the defogging control at a time t1 at which the IG switch 33 is set to the ON position. In the defogging control, the ECU 20 divides a unit period Tcyc into an OFF period (non-energization period) Toff and an ON period (energization period) Ton. The ECU 20 does not energize the camera heater 24 when the current time is in the OFF period Toff, and applies a predetermined voltage Vc to the camera heater 24 when the current time is in the ON period Ton. The length of the ON period Ton is set before the unit period Tcyc starts so as to achieve an electric power amount required for the defogging (hereinafter also referred to as "defogging electric power amount" or "first electric power amount") through the energization to the camera heater 24 in the unit period Tcyc. The ECU 20 starts a next unit period Tcyc when the current time reaches an end time of a current unit period Tcyc.

A time t2 corresponds to the operation start time. A time t3 corresponds to the operation end time. The ECU 20 continues to supply a predetermined voltage Vw to the wiper deicer 35 in the operation period Top from the time t2 to the time t3.

The deicing execution condition is satisfied at the time t2, and thus the ECU 20 starts the deicing control in a unit period Tcyc next to a current unit period Tcyc, which has already been started at the time t2 (see time t4). In the deicing control, the ECU 20 uses "a deicing electric power amount (hereinafter sometimes referred to as 'second electric power amount') larger than the defogging electric power amount" to energize the camera heater 24 in the unit period Tcyc. In this example, the voltage Vc applied to the camera heater 24 is the same between the defogging control and the deicing control. The deicing electric power amount is thus larger than the defogging electric power amount, and the length of the ON period Ton in the deicing control is consequently longer than the ON period Ton in the defogging control. As illustrated in FIG. 5, in the following example, the length of the ON period Ton for the deicing control is set in advance to the entire unit period Tcyc.

The ECU 20 finishes the deicing control at a time (t6) at which the unit period Tcyc starts after a deicing completion time (t5) at which a first unit area electric power amount Wsc given by Expression 1 reaches a second unit area electric power amount Wsw given by Expression 2, and resumes the defogging control.

$$Wsc=(Wc*Texe)/Sc \qquad \text{Expression 1}$$

The symbol Wc represents consumed electric power per second of the camera heater 24. The consumed electric power Wc is obtained by dividing the electric power amount in the unit period Tcyc by the unit period Tcyc at the time when the ON period Ton is set to the entire unit period Tcyc.

The symbol Texe represents an execution period of the deicing control.

The symbol Sc represents the area of the image capturing transparent region 101a.

$$Wsw=(Ww*Top)/Sw \qquad \text{Expression 2}$$

The symbol Ww represents a consumed electric power per second of the wiper deicer 35.

The symbol Top represents the period in which the wiper deicer 35 is in the ON state, that is, the operation period of the wiper deicer 35.

The symbol Sw represents the area of the stop position region SA.

When the driver determines that the deicing in the stop position region SA is completed, the driver again presses the deicer switch 34, to thereby change the deicer switch 34 from the ON state to the OFF state. At a time at which the deicer switch 34 is changed from the ON state to the OFF state, the operation period Top ends. The second unit area electric power amount Wsw is obtained by dividing a total electric power amount consumed by the wiper deicer 35 in the operation period Top by the area of the stop position region SA, and is an electric power amount required to melt ice in a unit area. When the electric power amount (first unit area electric power amount Wsc) per unit area of the image capturing transparent region 101a becomes equal to or larger than the second unit area electric power amount Wsw, there is a high possibility that the deicing in the image capturing transparent region 101a has been completed. Thus, the ECU 20 is configured to determine that the satisfaction of the deicing execution condition ends at the deicing completion time at which the first unit area electric power amount Wsc becomes equal to or larger than the second unit area electric power amount Wsw, and to finish the deicing control. With this configuration, it is possible to prevent a case in which the deicing control is finished even when the image capturing transparent region 101a is still frozen and a case in which the deicing control is continued even when the deicing in the image capturing transparent region 101a is completed.

"Wc/Sc" of Expression 1 and "Ww/Sw" of Expression 2 are fixed values, and are referred to as "camera coefficient Kc" and "wiper coefficient Kw," respectively. In this example, it is assumed that the camera coefficient Kc is smaller than the wiper coefficient Kw. Under this assumption, in order to match the first unit area electric power amount Wsc with the second unit area electric power amount Wsw, the execution period Texe is required to be longer than the operation period Top. That is, the deicing completion time is later than the operation end time. Thus, the ECU 20 uses Expression 3 to calculate an execution end period Tend at the time t3.

$$Tend=(Kw/Kc)*Top \qquad \text{Expression 3}$$

The ECU 20 starts to count the execution period Texe of the deicing control at the start time t4 of the deicing control, and finishes the deicing control at a time t6 at which the execution period Texe becomes equal to or longer than the execution end period Tend.

As a result, the ECU 20 continues the deicing control at and after the operation end time until the deicing completion time at which the first unit area electric power amount Wsc is equal to or larger than the second unit area electric power amount Wsw. Thus, it is possible to prevent the case in which the deicing control is finished even when the image capturing transparent region 101a is still frozen and the case in which the deicing control is continued even when the deicing in the image capturing transparent region 101a is completed and the electric power is thus wastefully consumed.

(Specific Operation)
<Deicer Switch Operation Control Routine>

The CPU of the ECU 20 ("CPU" hereinafter refers to the CPU of the ECU 20 unless otherwise specified) executes a deicer switch operation control routine illustrated in a flowchart of FIG. 6 each time a predetermined period elapses.

Figure 6:
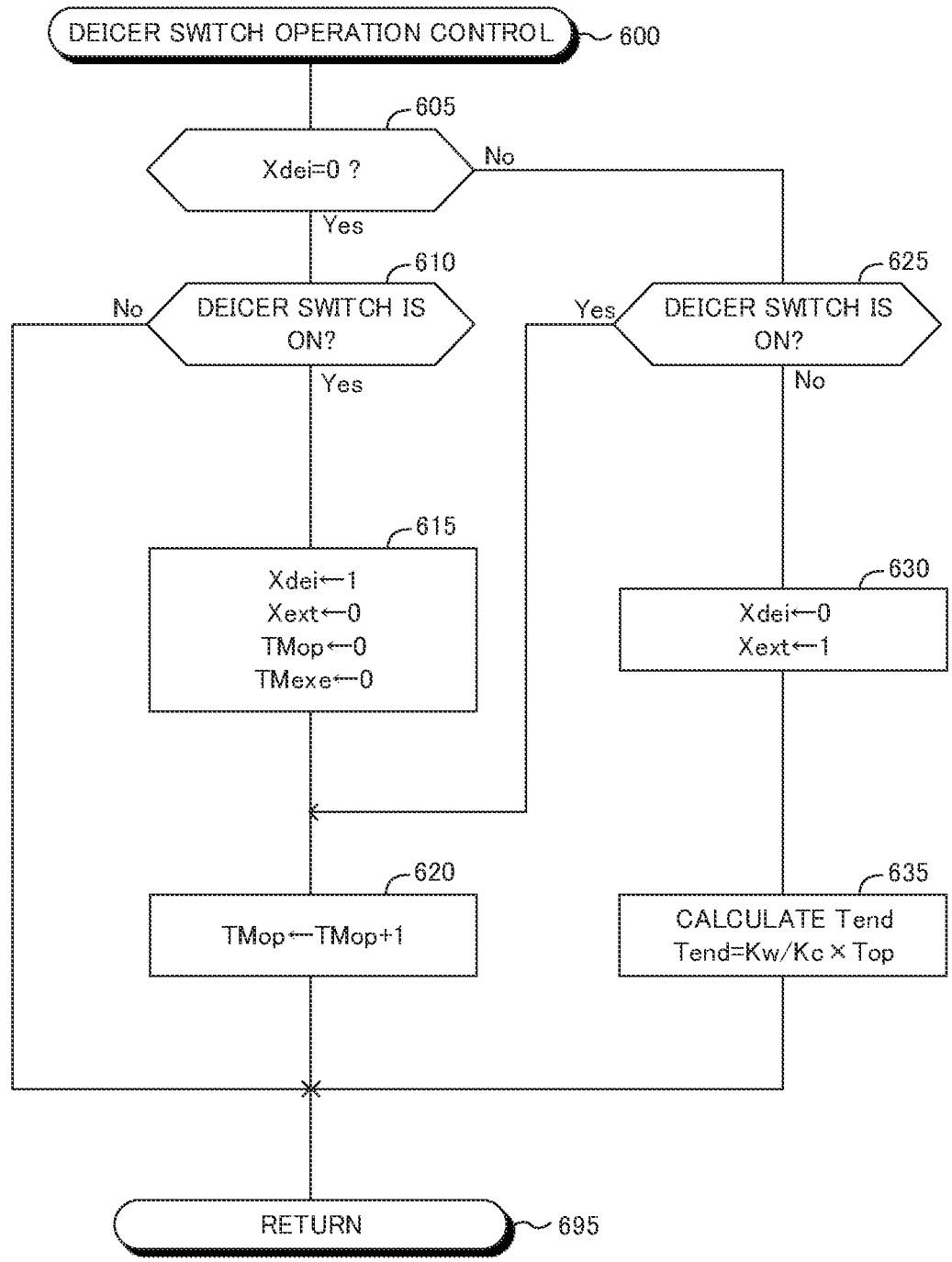
FIG. 6 is a flowchart for illustrating a deicer switch operation control routine to be executed by a CPU of an ECU (hereinafter simply referred to as "CPU").

Thus, the CPU starts processing from Step 600 of FIG. 6 at a predetermined timing, proceeds to Step 605, and determines whether or not the value of a deicing flag Xdei is "0".

The value of the deicing flag Xdei is set to "1" when the deicer switch 34 is in the ON state (see Step 615 described below), and is set to "0" when the deicer switch 34 is in the OFF state (see Step 630 described below).

When the value of the deicing flag Xdei is "0", the CPU makes a determination of "Yes" in Step 605, proceeds to Step 610, and determines whether or not the deicer switch 34 is in the ON state.

When the deicer switch 34 is in the OFF state, the CPU makes a determination of "No" in Step 610, proceeds to Step 695, and temporarily finishes this routine.

Meanwhile, when the CPU proceeds to Step 610 and the deicer switch 34 is in the ON state, the CPU makes a determination of "Yes" in Step 610, and executes processing of Step 615 and Step 620 in the stated order. After that, the CPU proceeds to Step 695, and temporarily finishes this routine.

Step 615: The CPU sets the value of the deicing flag Xdei to "1", sets the value of an extension flag Xext to "0", sets the value of an operation timer TMop to "0", and sets the value of an execution timer TMexe to "0".

The value of the extension flag Xext is set to "1" when the deicer switch 34 is changed from the ON state to the OFF state (see Step 630 described below). Further, the value of the extension flag Xext is set to "0" when the deicer switch 34 is changed from the OFF state to the ON state, and when the execution period Texe of the deicing control reaches the execution end period Tend (see Step 615 and Step 755 of FIG. 7 described below).

The operation timer TMop is a timer for counting the period (that is, the operation period Top) in which the deicer switch 34 is in the ON state. The execution timer TMexe is a timer for counting the execution period Texe of the deicing control.

Step 620: The CPU adds "1" to the operation timer TMop.

When the CPU proceeds to Step 605 after the value of the deicing flag Xdei is set to "1", the CPU makes a determination of "No" in Step 605, and proceeds to Step 625. In Step 625, the CPU determines whether or not the deicer switch 34 is in the ON state.

When the deicer switch 34 is in the ON state, the CPU makes a determination of "Yes" in Step 625, proceeds to Step 620, and adds "1" to the operation timer TMop. After that, the CPU proceeds to Step 695, and temporarily finishes this routine.

Meanwhile, when the CPU proceeds to Step 625 and the deicer switch 34 is in the OFF state, the CPU makes a determination of "No" in Step 625, and executes processing of Step 630 and Step 635 in the stated order. After that, the CPU proceeds to Step 695, and temporarily finishes this routine.

Step 630: The CPU sets the value of the deicing flag Xdei to "0", and sets the value of the extension flag Xext to "1".

Step 635: The CPU calculates the execution end period Tend as given by Expression 3.

<Duty Ratio Determination Routine>

Figure 7:
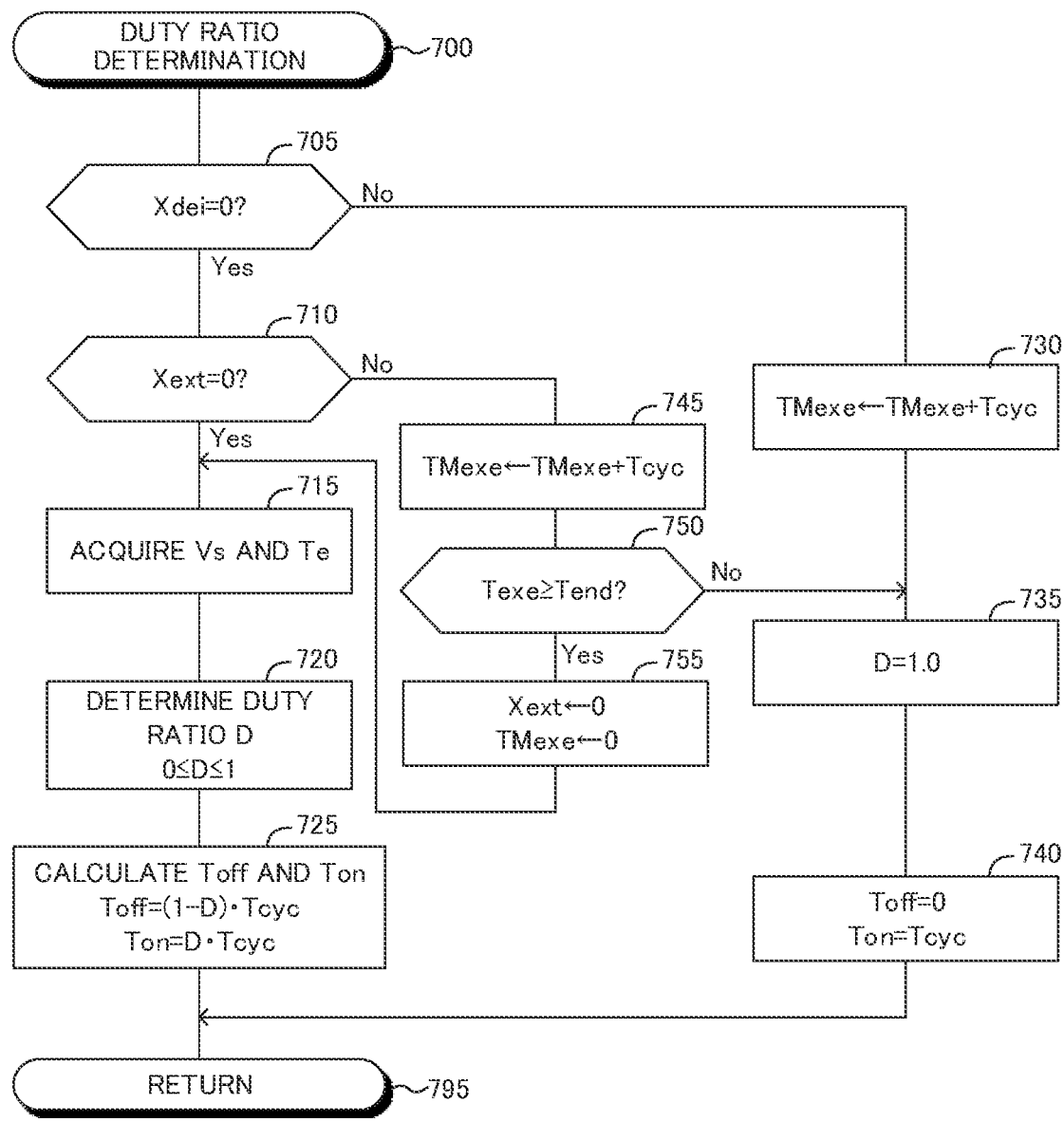
FIG. 7 is a flowchart for illustrating a duty ratio determination routine to be executed by the CPU.

The CPU executes a duty ratio determination routine illustrated in a flowchart of FIG. 7 each time the unit period Tcyc elapses.

Thus, the CPU starts processing from Step 700 of FIG. 7 at a predetermined timing, proceeds to Step 705, and determines whether or not the value of the deicing flag Xdei is "0".

When the value of the deicing flag Xdei is "0", the CPU makes a determination of "Yes" in Step 705, and proceeds to Step 710. In Step 710, the CPU determines whether or not the value of the extension flag Xext is "0".

When the value of the extension flag Xext is "0", the CPU makes a determination of "Yes" in Step 710, and executes processing of Step 715 to Step 725 in the stated order. After that, the CPU proceeds to Step 795, and temporarily finishes this routine.

Step 715: The CPU acquires the vehicle speed Vs and the outside air temperature Te.

Step 720: The CPU applies the vehicle speed Vs and the outside air temperature Te to a duty ratio map (not shown), to thereby determine a duty ratio D. The duty ratio is a ratio of the ON period Ton to the unit period Tcyc, and is a value equal to or larger than 0 and equal to or smaller than 1.

To the duty ratio map, there is, in advance, set a relationship between the vehicle speed Vs and the outside air temperature Te, and the duty ratio D so as to provide the electric power amount of the camera heater 24 per unit period Tcyc required to remove or prevent the fogging of the image capturing transparent region 101a. In more detail, to the duty ratio map, there is, in advance, set the above-mentioned relationship so that the duty ratio D increases as the vehicle speed Vs increases and the duty ratio Q increases as the outside air temperature Te decreases.

Step 725: Expression 4 and Expression 5 are used to calculate the OFF period f and the ON period Ton.

$$Toff=(1-D)*Tcyc \quad \text{Expression 4}$$

$$Ton=D*Tcyc \quad \text{Expression 5}$$

When the CPU proceeds to Step 705 and the value of the deicing flag Xdei is "1", the CPU makes a determination of "No" in Step 705, and executes processing of Step 730 to Step 740 in the stated order. After that, the CPU proceeds to Step 795, and temporarily finishes this routine.

Step 730: The CPU adds the unit period Tcyc being the execution interval of this routine to the execution timer TMexe.

Step 735: The CPU determines the duty ratio D as "1.0".

As described above, this is because, in the deicing control, the entire unit period Tcyc is set to the ON period Ton.

Step 740: The CPU sets the OFF period Toff to "0", and sets the ON period Ton to "Tcyc".

After that, when the value of the deicing flag Xdei is set to "0" due to the deicer switch 34 being changed to the OFF state and the value of the extension Xext is set to "1", the CPU makes a determination of "Yes" in Step 705, makes a determination of "No" in Step 710, and executes processing of Step 745 and Step 750 in the stated order. After that, the CPU proceeds to Step 795, and temporarily finishes this routine.

Step 745: The CPU adds the unit period Tcyc to the execution timer TMexe.

Step 750: The CPU determines whether or not the execution period Texe indicated by the execution timer TMexe is equal to or longer than the execution end period Tend.

When the execution timer TMexe is shorter than the execution end period Tend, the CPU makes a determination of "No" in Step 750, and executes the processing of Step 735 and Step 740 in the stated order (that is, the deicing control is continued). After that, the CPU proceeds to Step 795, and temporarily finishes this routine.

Meanwhile, when the execution timer TMexe is equal to or longer than the execution end period Tend, the CPU determines that the satisfaction of the deicing execution condition ends. In this case, the CPU makes a determination of "Yes" in Step 750, and proceeds to Step 755. In Step 755, the CPU sets the value of the extension flag Xext to "0", and sets the value of the execution timer TMext to "0". After that, the CPU executes the processing of Step 715 to Step 725 in order to set the OFF period Toff and the ON period Ton for the defogging control, proceeds to Step 795, and temporarily finishes this routine.

<Camera Heater Energization Control Routine>

Figure 8:
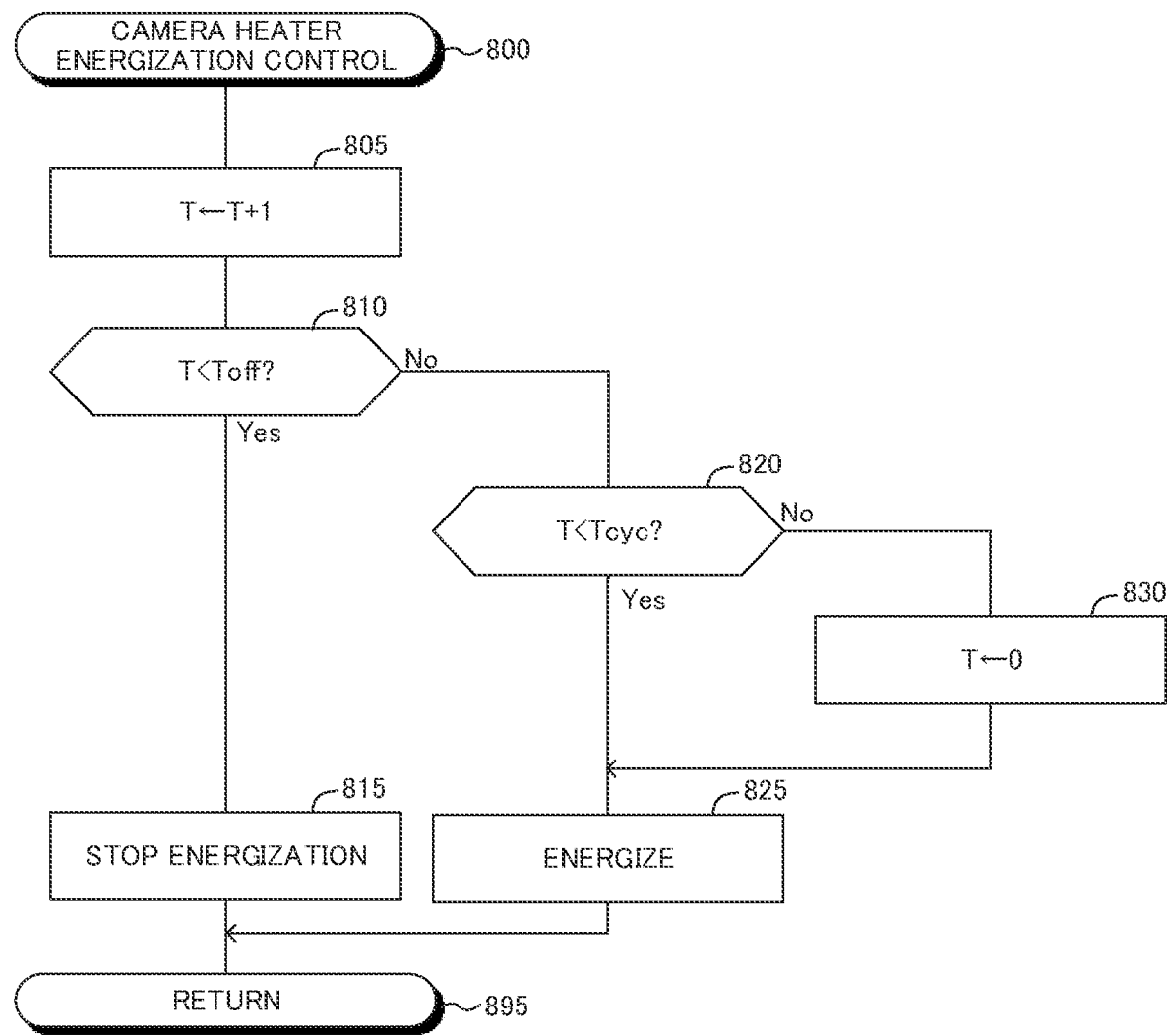
FIG. 8 is a flowchart for illustrating a heater energization control routine to be executed by the CPU.

The CPU executes a camera heater energization control routine illustrated in a flowchart of FIG. 8 each time a predetermined period elapses.

Thus, the CPU starts processing from Step 800 of FIG. 8 at a predetermined timing, and executes processing of Step 805 and Step 810 in the stated order.

Step 805: The CPU adds "1" to a value of a timer T.

The timer T is a timer for counting a period elapsed from a time at which the unit period Tcyc starts. The value of the timer T is set to "0" when the unit period Tcyc has elapsed (see Step 830 described below). Further, the value of the timer T is set to "0" through an initial routine executed by the CPU when the IG switch 33 is set from the OFF position to the ON position.

Step 810: The CPU determines whether or not the period indicated by the timer T is shorter than the OFF period Toff.

When the period indicated by the timer T is shorter than the OFF period Toff, the CPU makes a determination of "Yes" in Step 810, and proceeds to Step 815. In Step 815, the CPU stops the energization to the camera heater 24, proceeds to Step 895, and temporarily finishes this routine.

Meanwhile, when the period indicated by the timer T is equal to or longer than the OFF period Toff, the CPU makes a determination of "No" in Step 810, and proceeds to Step 820. In Step 820, the CPU determines whether or not the period indicated by the timer T is shorter than the unit period Tcyc.

When the period indicated by the timer T is shorter than the unit period Tcyc, the CPU makes a determination of "Yes" in Step 820, and proceeds to Step 825. In Step 825, the CPU applies the predetermined voltage Vc to the camera heater 24, to thereby energize the camera heater 24. After that, the CPU proceeds to Step 795, and temporarily finishes this routine.

Meanwhile, when the timer T is equal to or longer than the unit period Tcyc, the CPU makes a determination of "No" in Step 820, proceeds to Step 830, and sets the value of the timer to "0". After that, the CPU proceeds to Step 825, energizes the camera heater 24, proceeds to Step 895, and temporarily finishes this routine.

As described above, the CPU determines that the deicing execution condition for executing the deicing control is satisfied in the period from the operation start time to the deicing completion time, and executes the deicing control. As a result, the deicing control can be executed when there is a high possibility that the image capturing transparent region is frozen. Further, it is possible to reduce the possibility that the image capturing transparent region 101a is still frozen when the deicing control is finished, and it is possible to prevent the continuation of the deicing control even when the deicing in the image capturing transparent region 101a is completed.

The present disclosure is not limited to the above-mentioned at least one embodiment, and various modification examples can be adopted within the scope of the present disclosure.

First Modification Example

In a first modification example, description is given of a case in which the camera coefficient Kc is equal to or larger than the wiper coefficient Kw. In this case, when the ON period Ton is set to the entire unit period Tcyc in the deicing control as in the at least one embodiment, the first unit area electric power amount Wsc matches the second unit area electric power amount Wsw before the operation period Top ends. When the first unit area electric power amount Wsc matches the second unit area electric power amount Wsw, it is estimated that the deicing in the image capturing transparent region 101a is completed. Therefore, when the deicing control is executed after the first unit area electric power amount Wsc matches the second unit area electric power amount Wsw, the camera heater 24 consumes wastefully electric power.

Thus, the heater control device 10 according to the first modification example uses, for the deicing control, such an ON period Ton that the first unit area electric power amount Wsc matches the second unit area electric power amount Wsw when the operation period Top ends. After that, the heater control device 10 determines that the deicing execution condition is satisfied over the operation period Top, and thus executes the deicing control.

In the first modification example, the deicer switch operation control routine and the duty ratio determination routine are different from those in the at least one embodiment, and the camera heater energization control routine is the same as that in the at least one embodiment.

<Deicer Switch Operation Control Routine>

Figure 9:
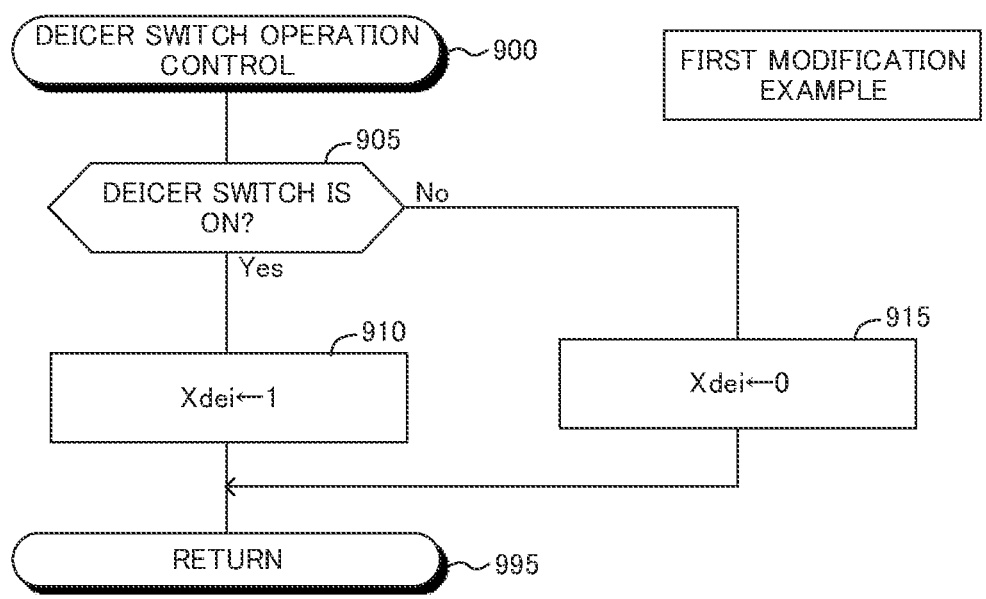
FIG. 9 is a flowchart for illustrating a deicer switch operation control routine to be executed by the CPU in a first modification example of the at least one embodiment of the present disclosure.

First, with reference to FIG. 9, description is given of the deicer switch operation control routine in the first modification example.

The CPU starts the processing from Step 900 of FIG. 9 at a predetermined timing, and proceeds to Step 905. In Step 905 the CPU determines whether or not the deicer switch 34 is in the ON state.

When the deicer switch 34 is in the ON state, the CPU makes a determination of "Yes" in Step 905, proceeds to Step 910, and sets the value of the deicing flag Xdei to "1". After that, the CPU proceeds to Step 995, and temporarily finishes this routine.

Meanwhile, when the deicer switch 34 is in the OFF state, the CPU makes a determination of "No" in Step 905, proceeds to Step 915, and sets the value of the deicing flag Xdei to "0". After that, the CPU proceeds to Step 995, and temporarily finishes this routine.

<Duty Ratio Determination Routine>

Figure 10:
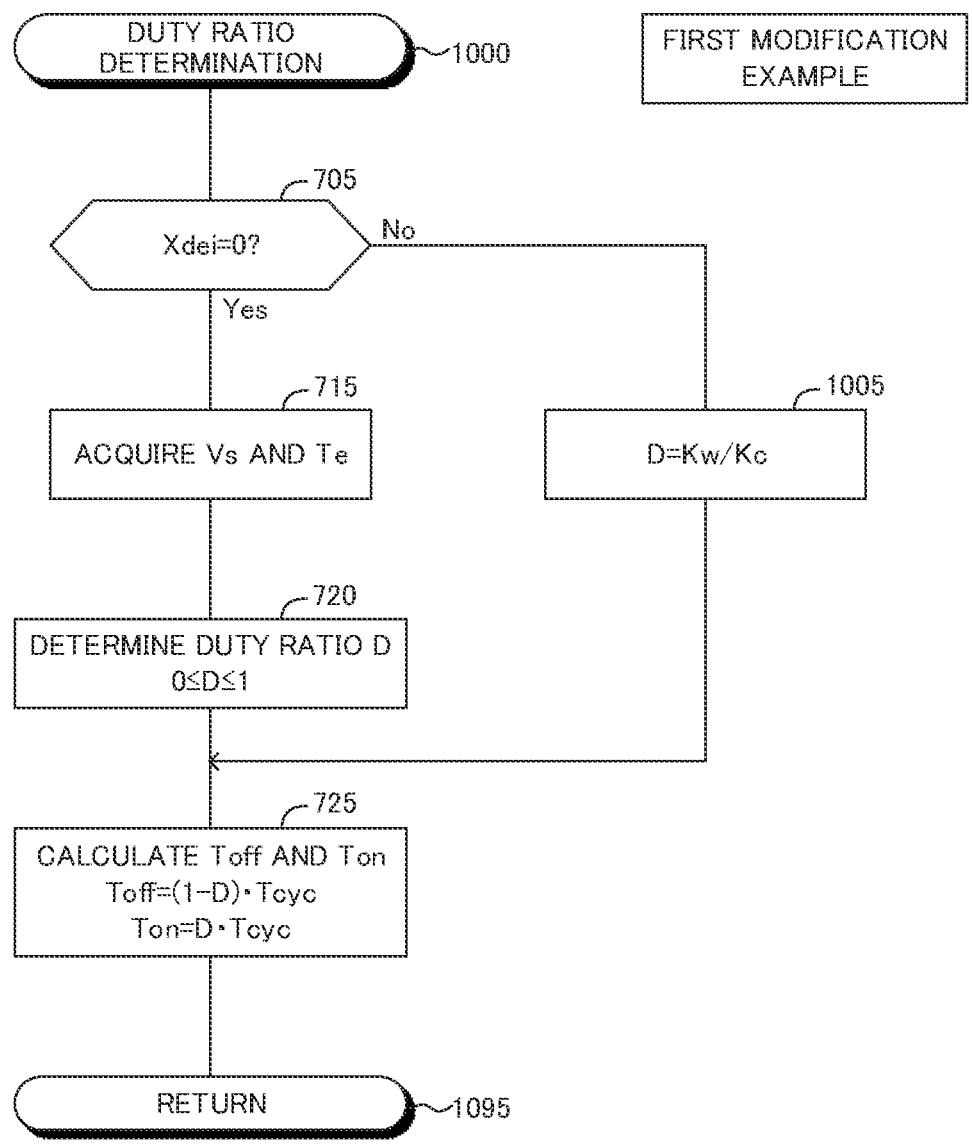
FIG. 10 is a flowchart for illustrating a duty ratio determination routine to be executed by the CPU in the first modification example of the at least one embodiment of the present disclosure.

With reference to FIG. 10, description is now given of the duty ratio determination routine in the first modification example. In FIG. 10, a step in which the same processing as that of the step of FIG. 7 is executed is denoted by the same reference numeral as the reference numeral used in FIG. 7, and description thereof is omitted.

The CPU starts the processing from Step 1000 of FIG. 10 at a predetermined timing, and proceeds to Step 705 of FIG. 10. When the value of the deicing flag Xdei is "0", the CPU makes the determination of "Yes" in Step 705 of FIG. 10, executes the processing of Step 715 to Step 725 of FIG. 10, and determines the OFF period Toff and the ON period Ton for the defogging control. After that, the CPU proceeds to Step 1095, and temporarily finishes this routine.

Meanwhile, when the value of the deicing flag Xdei is "1", the CPU makes the determination of "No" in Step 705, and proceeds to Step 1005. In Step 1005, the CPU sets the duty ratio D for the deicing control to a value calculated in advance as given by Expression 6. After that, the CPU executes the processing of Step 725 of FIG. 10, proceeds to Step 1095, and temporarily finishes this routine.

$$D=Kw/Kc \qquad \text{Expression 6}$$

When the deicing control in accordance with the duty ratio D set to the value calculated as given by Expression 6 is executed over the operation period Top, the first unit area electric power amount Wsc matches the second unit area electric power amount Wsw.

As can be understood from the description given above, according to the first modification example, when the camera coefficient Kc is equal to or larger than the wiper coefficient Kw, it is possible to prevent the deicing control from continuing even when the deicing in the image capturing transparent region 101a is completed.

Second Modification Example

In the at least one embodiment and the first modification example, when the camera heater 24 is energized, the ECU 20 applies a constant voltage Vc to the camera heater 24. In a second modification example, the voltage Vc to be applied by the ECU 20 to the camera heater 24 is variable.

The heater control device 10 according to the second modification example executes deicing control of energizing the camera heater 24 through use of such a voltage Vc that matches the first unit area electric power amount Wsc with the second unit area electric power amount Wsw at the operation end time of the operation period Top.

In the second modification example, the deicer switch operation control is the same as that in the first modification example, and a voltage determination routine for determining the voltage Vc is executed in place of the duty ratio determination routine. Further, the camera heater energization control in the second modification example is different from that in the first modification example in a point that the energization control is not executed in accordance with the OFF period Toff and the ON period Ton, but the voltage Vc determined by the voltage determination routine is applied to the camera heater 24.

<Voltage Determination Routine>

Figure 11:
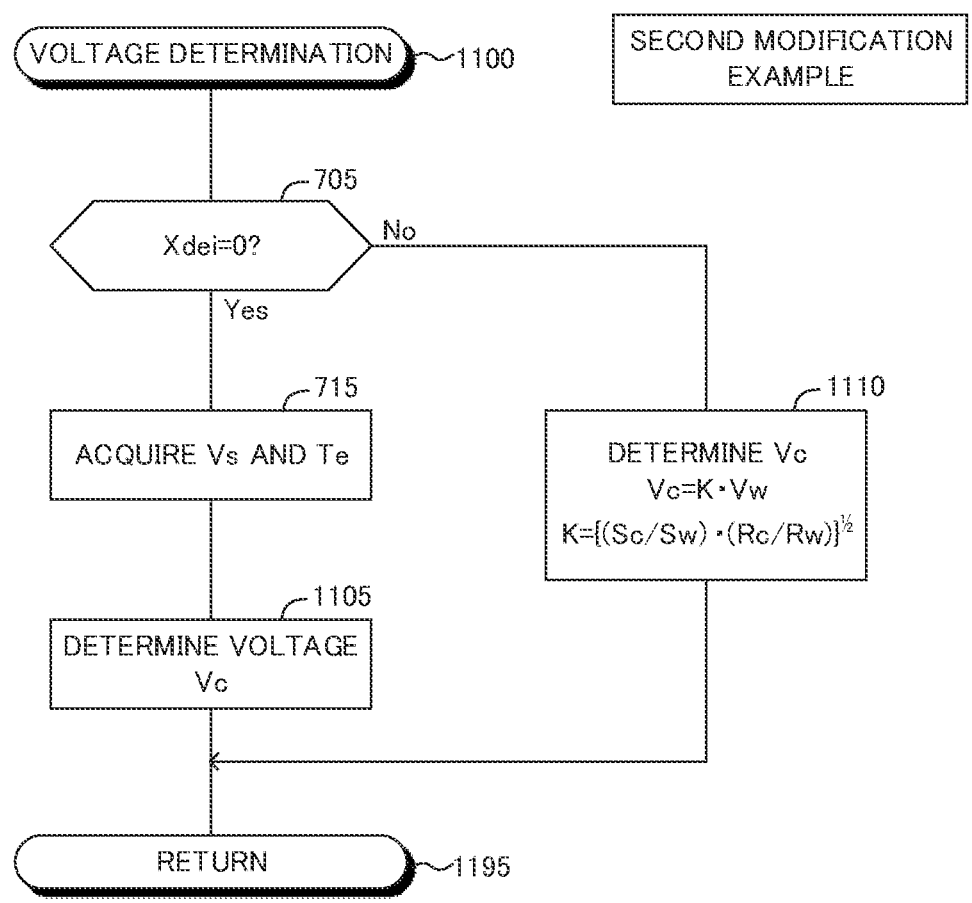
FIG. 11 is a flowchart for illustrating a voltage determination routine to be executed by the CPU in a second modification example of the at least one embodiment of the present disclosure.

With reference to FIG. 11, description is now given of the voltage determination routine in the second modification example. In FIG. 11, a step in which the same processing as that of the step of FIG. 10 is executed is denoted by the same reference numeral as the reference numeral used in FIG. 10 and description thereof is omitted.

The CPU starts the processing from Step 1100 of FIG. 11 at a predetermined timing, and proceeds to Step 705 of FIG. 11. When the value of the deicing flag Xdei is "0", the CPU makes the determination of "Yes" in Step 705 of FIG. 11, and proceeds to the processing of Step 715 of FIG. 11. The CPU acquires the vehicle speed Vs and the outside air temperature Te in Step 715 of FIG. 11, and proceeds to Step 1105. In Step 1105, the CPU applies the vehicle speed Vs and the outside air temperature Te to a voltage map (not shown), to thereby determine the voltage Vc for the defogging control. To the voltage map, there is, in advance, set a relationship between the vehicle speed Vs and the outside air temperature Te, and the voltage Vc so as to provide the electric power amount for the camera heater 24 per unit period Tcyc required to remove or prevent the fogging of the image capturing transparent region 101a. In more detail, to the voltage map, there is, in advance, set the above-mentioned relationship so that the voltage Vc increases as the vehicle speed Vs increases and the voltage Vc increases as the outside air temperature Te decreases.

After that, the CPU proceeds to Step 1195, and temporarily finishes this routine.

Meanwhile, when the value of the deicing flag Xdei is "1", the CPU makes a determination of "No" in Step 705 of FIG. 11, and proceeds to Step 1110 of FIG. 11, In Step 1110, the CPU sets the voltage Vc for the deicing control to a value calculated in advance as given by Expression 7 and Expression 8. After that, the CPU proceeds to Step 1195, and temporarily finishes this routine.

$$Vc = K * Vw \quad \text{Expression 7}$$

$$K = \{(Sc/Sw) * (Rc/Rw)\}^{1/2} \quad \text{Expression 8}$$

The symbol Rc represents a resistance value of the camera heater 24.

The symbol Rw represents a resistance value of the wiper deicer 35.

When the voltage Vc is set to the value as given by Expression 7 and Expression 8, and the deicing control is executed over the operation period Top, the first unit area electric power amount Wsc matches the second unit area electric power amount Wsw.

As can be understood from the above description, according to the second modification example, irrespective of whether or not the camera coefficient Kc is larger than the wiper coefficient Kw, it is possible to execute the deicing control for a period equal to the operation period Top, to thereby match the first unit area electric power amount Wsc with the second unit area electric power amount Wsw. As a result, it is possible to prevent the case in which the deicing control is finished even when the image capturing transparent region 101a is still frozen and the case in which the deicing control is continued even when the deicing in the image capturing transparent region 101a is completed and the electric power is thus wastefully consumed.

Third Modification Example

It is not required that the image capturing transparent region 101a and the stop position region SA be regions of one window glass, and the window glass including the image capturing transparent region 101a and the window glass including the stop position region SA may be different from each other. The stop position region SA may be provided in a partial region of the front window 101, and the image capturing transparent region 101a may be provided in a partial region of a rear window 102. That is, the camera sensor 22 may capture an image of a view backward of the vehicle VA through the image capturing transparent region 101a. In this case, the ECU 20 executes parking assist control as the driving assist control based on the image data generated by the camera sensor 22. In the parking assist control, for example, the ECU 20 displays, on a display (not shown), the image of the view backward of the vehicle VA based on the image data when the driver is parking the vehicle VA. Further; the ECU 20 may automatically move the vehicle VA to a target parking region based on the image data.

Fourth Modification Example

In the above-mentioned at least one embodiment and modification examples, the deicing control is executed based on the operation on the deicer switch 34, but the deicing control may be executed based on the operation on the defogger switch 41 in place of the operation on the deicer switch 34.

The defogger switch 41 is changed from an OFF state to an ON state through a pressing operation by the driver, and is changed from the ON state to the OFF state through a next pressing operation by the driver. In a period in which the defogger switch 41 is in the ON state, the ECU 20 energizes the rear defogger 42. This energization control for the rear defogger 42 is sometimes referred to as "heating control."

The rear defogger 42 is an electric heating wire provided on an entire surface of the rear window 102 of the vehicle VA. When the rear defogger 42 is energized, the rear window 102 is heated with heat generated by the rear defogger 42.

The driver usually executes the pressing operation (hereinafter referred to as "defogging operation") on the defogger switch 41 in order to remove fogging of the rear window 102, but sometimes executes the pressing operation (hereinafter referred to as "deicing operation") on the defogger switch 41 in order to deice the rear window 102.

Immediately after an IG ON time at which the IG switch 33 was set to the ON position, a sufficiently long period has not elapsed since an air conditioner (not shown) started an operation, and hence there is a high possibility that the temperature in a cabin of the vehicle VA is substantially the same as the outside air temperature. Thus, there is a high possibility that fogging has not occurred on the rear window 102. When the pressing operation is executed on the defogger switch 41 immediately after the IG ON time, there is a high possibility that the operation is the deicing operation.

Thus, when a time (operation start time) at which the defogger switch 41 is changed from the OFF state to the ON state is within a predetermined period elapsed from the IG ON time, the CPU determines that the defogger switch 41 is used for the deicing operation, and sets the value of the deicing flag Xdei to "1". Meanwhile, when the operation start time is after a time at which the predetermined period has elapsed from the IG ON time, the CPU determines that the defogger switch 41 is used for the defogging operation.

In this case, the CPU does not set the value of the deicing flag Xdei to "1", and maintains the value of the deicing flag Xdei to be "0".

Fifth Modification Example

When a predetermined period has elapsed without a next pressing operation since the deicer switch 34 was changed from the OFF state to the ON state, the CPU may determine that the deicer switch 34 is changed to the OFF state. That is, the CPU makes the determination of "No" in Step 625 of FIG. 6, and makes the determination of "No" in Step 905 of FIG. 9. Further, the CPU stops the energization to the wiper deicer 36. The same applies to the defogger switch 41.

Sixth Modification Example

The deicer switch 34 may be configured to be positioned at the ON position (that is, the deicer switch 34 is set to the ON state) only while the driver is executing the pressing operation on the deicer switch 34, and to be positioned to the OFF position (that is, the deicer switch 34 is set to the OFF state) when the driver releases the pressing operation. The same applies to the defogger switch 41.

What is claimed is:

1. A heater control device, comprising:
   a camera configured to capture an image of an outside of a vehicle from an inside of the vehicle through an image capturing transparent region being a partial region of a window glass of the vehicle, to thereby generate image data;
   an electric heating wire configured to generate heat by being energized, and to heat the image capturing transparent region with the generated heat;
   a glass heater that includes another electric heating wire, configured to generate heat by being energized, and to heat a specific region with the generated heat, the specific region being a partial region of one of the window glass and another window glass different from the window glass and corresponding to a position of a wiper blade at a time when the wiper blade has finished a wiping operation for wiping one of the window glass and the another window glass; and
   a control unit, including a microcomputer, configured to execute driving assist control, which is control for the vehicle to assist in driving by a driver of the vehicle based on the image data, and to control the energization to the electric heating wire and the energization to the glass heater,
   wherein the control unit is configured to:
      execute heating control of energizing the glass heater in order to heat the specific region during an operation period from a start time at which an operation switch is changed from an OFF state to an ON state through an operation of the driver to an end time at which the operation switch is changed from the ON state to the OFF state; and
      execute deicing control of energizing the electric heating wire in order to deice the image capturing transparent region during a period in which a deicing execution condition, which is started to be satisfied at the start time and ends to be satisfied at the end time or a time after the end time, is satisfied,
   wherein the control unit is configured to determine that the satisfaction of the deicing execution condition is finished at a deicing completion time and to finish the deicing control, the deicing completion time being a time at which a first unit area electric power amount, which is obtained by dividing a total electric power amount consumed by the electric heating wire in the deicing control after the deicing control starts by an area of the image capturing transparent region, becomes equal to or larger than a second unit area electric power amount, which is obtained by dividing a total electric power amount consumed by the glass heater during the operation period by an area of the specific region.

2. The heater control device according to claim 1, wherein the control unit is configured to:
   continue executing the deicing control at and after the end time when the deicing completion time is after the end time in accordance with a relationship between consumed electric power of the electric heating wire and the area of the image capturing transparent region in the deicing control, and consumed electric power of the glass heater and the area of the specific region in the heating control; and
   determine that the satisfaction of the deicing execution condition is finished at the deicing completion time, and to finish the deicing control.

3. The heater control device according to claim 1, wherein the control unit is configured to:
   assign, in the deicing control, a predetermined unit period to a non-energization period in which the energization to the electric heating wire is not executed and to an energization period in which a predetermined voltage is applied to the electric heating wire, to thereby execute the energization to the electric heating wire;
   start a new unit period when the predetermined unit period has elapsed since the start of the deicing control; and
   determine the non-energization period and the energization period so that the deicing completion time matches the end time when the deicing completion time is before the end time in accordance with a relationship between consumed electric power of the electric heating wire and the area of the image capturing transparent region in the deicing control in a case in which it is assumed that the entire predetermined unit period is assigned to the energization period, and consumed electric power of the glass heater and the area of the specific region in the heating control.

4. The heater control device according to claim 1, wherein the control unit is configured to apply, to the electric heating wire, such a voltage that the deicing completion time matches the end time in the deicing control.

5. The heater control device according to claim 1, wherein the control unit is configured to:
   execute, when the deicing execution condition is not satisfied, defogging control of energizing the electric heating wire with a defogging electric power amount per predetermined unit period in order to perform one of removal or prevention of fogging of the image capturing transparent region, and
   energize, in the deicing control, the electric heating wire with a deicing electric power amount per predetermined unit period, the deicing electric power amount being larger than the defogging electric power amount and being used to deice the image capturing transparent region.

6. A heater control device, comprising:
   a camera configured to capture an image of an outside of a vehicle from an inside of the vehicle through an image capturing transparent region being a partial region of a window glass of the vehicle, to thereby generate image data;

an electric heating wire configured to generate heat by being energized, and to heat the image capturing transparent region with the generated heat;

a glass heater including another electric heating wire, configured to generate heat by being energized, and to heat a specific region with the generated heat, the specific region being an entire surface of another window glass different from the window glass; and a control unit, including a microcomputer, configured to execute driving assist control, which is control for the vehicle to assist in driving by a driver of the vehicle based on the image data, and to control the energization to the electric heating wire and the energization to the glass heater, wherein the control unit is configured to:
execute heating control of energizing the glass heater in order to heat the specific region during an operation period from a start time at which an operation switch is changed from an OFF state to an ON state through an operation of the driver to an end time at which the operation switch is changed from the ON state to the OFF state; and execute deicing control of energizing the electric heating wire in order to deice the image capturing transparent region during a period in which a deicing execution condition, which is started to be satisfied at the start time and ends to be satisfied at the end time or a time after the end time, is satisfied, wherein the control unit is configured to determine that the satisfaction of the deicing execution condition is finished at a deicing completion time and to finish the deicing control, the deicing completion time being a time at which a first unit area electric power amount, which is obtained by dividing a total electric power amount consumed by the electric heating wire in the deicing control after the deicing control starts by an area of the image capturing transparent region, becomes equal to or larger than a second unit area electric power amount, which is obtained by dividing a total electric power amount consumed by the glass heater during the operation period by an area of the specific region.

7. The heater control device according to claim 6, wherein the control unit is configured to:
continue to execute the deicing control at and after the end time when the deicing completion time is after the end time in accordance with a relationship between consumed electric power of the electric heating wire and the area of the image capturing transparent region in the deicing control, and consumed electric power of the glass heater and the area of the specific region in the heating control; and determine that the satisfaction of the deicing execution condition is finished at the deicing completion time, and to finish the deicing control.

8. The heater control device according to claim 6, wherein the control unit is configured to:
assign, in the deicing control, a predetermined unit period to a non-energization period in which the energization to the electric heating wire is not executed and to an energization period in which a predetermined voltage is applied to the electric heating wire, to thereby execute the energization to the electric heating wire;

start a new unit period when the predetermined unit period has elapsed since the start of the deicing control; and determine the non-energization period and the energization period so that the deicing completion time matches the end time when the deicing completion time is before the end time in accordance with a relationship between consumed electric power of the electric heating wire and the area of the image capturing transparent region in the deicing control in a case in which it is assumed that the entire predetermined unit period is assigned to the energization period, and consumed electric power of the glass heater and the area of the specific region in the heating control.

9. The heater control device according to claim 6, wherein the control unit is configured to apply, to the electric heating wire, such a voltage that the deicing completion time matches the end time in the deicing control.

10. The heater control device according to claim 6, wherein the control unit is configured to:
execute, when the deicing execution condition is not satisfied, defogging control of energizing the electric heating wire with a defogging electric power amount per predetermined unit period in order to perform one of removal or prevention of fogging of the image capturing transparent region, and energize, in the deicing control, the electric heating wire with a deicing electric power amount per predetermined unit period, the deicing electric power amount being larger than the defogging electric power amount and being used to deice the image capturing transparent region.

* * * * *